United States Patent
Mi et al.

(10) Patent No.: US 11,269,699 B2
(45) Date of Patent: Mar. 8, 2022

(54) METHOD AND DEVICE FOR PROCESSING AN APPLICATION

(71) Applicant: Beijing Xiaomi Mobile Software Co., Ltd., Beijing (CN)

(72) Inventors: Siyuan Mi, Beijing (CN); Lin Fan, Beijing (CN); Zhanwei Luo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/844,732

(22) Filed: Apr. 9, 2020

(65) Prior Publication Data

US 2021/0182129 A1 Jun. 17, 2021

(30) Foreign Application Priority Data

Dec. 11, 2019 (CN) .......................... 201911268359.6

(51) Int. Cl.
*G06F 9/54* (2006.01)
(52) U.S. Cl.
CPC .................... *G06F 9/545* (2013.01)
(58) Field of Classification Search
None
See application file for complete search history.

(56) References Cited

U.S. PATENT DOCUMENTS

| 6,088,516 A | 7/2000 | Kreisel et al. | |
| 2013/0007842 A1* | 1/2013 | Park | G06F 21/74 726/3 |
| 2013/0227565 A1* | 8/2013 | Lee | G06F 9/45558 718/1 |
| 2016/0132420 A1 | 5/2016 | Kuo et al. | |
| 2016/0196432 A1 | 7/2016 | Main et al. | |
| 2016/0205082 A1 | 7/2016 | Puderer et al. | |
| 2018/0367434 A1* | 12/2018 | Kushmerick | H04L 43/14 |
| 2019/0116348 A1* | 4/2019 | Liu | H04N 9/7921 |
| 2019/0278910 A1* | 9/2019 | Zhang | G06F 9/468 |

(Continued)

FOREIGN PATENT DOCUMENTS

| CN | 106371826 A | 2/2017 |
| CN | 106445647 A | 2/2017 |

(Continued)

OTHER PUBLICATIONS

Supplementary European Search Report in European Application No. 20171973.9, dated Oct. 26, 2020.

(Continued)

*Primary Examiner* — Charles E Anya
(74) *Attorney, Agent, or Firm* — Finnegan, Henderson, Farabow, Garrett & Dunner, L.L.P.

(57) ABSTRACT

A method for processing an application is applied to a terminal including a main space occupied by a main system and a clone space occupied by a clone system. The method includes: acquiring a cross-space processing instruction sent by a first system in a first space is acquired; and performing corresponding processing on a target application in a second space based on the cross-space processing instruction, wherein the first space is the main space and the second space is the clone space, or the first space is the clone space and the second space is the main space.

10 Claims, 5 Drawing Sheets

(56) References Cited

U.S. PATENT DOCUMENTS

| | | |
|---|---|---|
| 2019/0377656 A1* | 12/2019 | Choe .................. G06F 11/3495 |
| 2020/0012511 A1* | 1/2020 | Ganesh ................ G06F 9/4812 |
| 2020/0117499 A1* | 4/2020 | Lee ...................... G06F 3/1454 |
| 2020/0244637 A1 | 7/2020 | Main et al. |

FOREIGN PATENT DOCUMENTS

| | | |
|---|---|---|
| CN | 106681773 A | 5/2017 |
| CN | 107948971 A | 4/2018 |

OTHER PUBLICATIONS

First Office Action dated Nov. 2, 2021, from the State Intellectual Property Office of People's Republic of China in counterpart Chinese Application No. 201911268359.6.

* cited by examiner

METHOD AND DEVICE FOR PROCESSING AN APPLICATION

CROSS-REFERENCE TO RELATED APPLICATIONS

This application is based upon and claims priority to Chinese Patent Application No. 201911268359.6, filed on Dec. 11, 2019, the entire content of which is incorporated herein by reference.

TECHNICAL FIELD

The present disclosure generally relates to the technical field of computer communication, and more particularly, to a method and device for processing an application.

BACKGROUND

Some intelligent terminals, for example, a mobile phone, have a clone function. After the clone function is turned on, an intelligent terminal includes a main system and a clone system. The clone system is a virtual system environment divided from the intelligent terminal and with an independent user space. A space occupied by the main system is referred to as a main space, and a space occupied by the clone system is referred to as a clone space. The main space and the clone space are mutually independent. Different desktop passwords may be required to enter a main space desktop and a clone space desktop.

In related art, when a user intends to install an application (App) into a space that is not used at present, a desktop password corresponding to the space needs to be entered to trigger a terminal to enter the space desktop and use the space. Then the user may execute a program installation operation to install the App into the space. However, such App installation operations may be complicated and have low installation efficiency.

SUMMARY

According to a first aspect of embodiments of the present disclosure, a method for processing an application, applied to a terminal including a main space occupied by a main system and a clone space occupied by a clone system, includes: acquiring a cross-space processing instruction sent by a first system in a first space; and performing corresponding processing on a target application in a second space based on the cross-space processing instruction, wherein the first space is the main space and the second space is the clone space, or the first space is the clone space and the second space is the main space.

According to a second aspect of the embodiments of the present disclosure, a device for processing an application, applied to a terminal including a main space occupied by a main system and a clone space occupied by a clone system, includes: a processor; and a memory configured to store processor-executable instructions, wherein the processor is configured to: acquire a cross-space processing instruction sent by a first system in a first space; and perform, based on the cross-space processing instruction, corresponding processing on a target application in a second space, wherein the first space is the main space and the second space is the clone space, or the first space is the clone space and the second space is the main space.

According to a third aspect of the embodiments of the present disclosure, a non-transitory computer-readable storage medium has stored instructions that, when executed by a processor of a terminal, cause the terminal to perform the method for processing an application according to the first aspect.

It is to be understood that the above general description and detailed description below are exemplary and explanatory, and not intended to limit the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only for the purpose of describing exemplary embodiments and not intended to limit the present disclosure. For example, the term "and/or" used in the present disclosure refers to and includes one or any or all possible combinations of multiple associated items that are listed. Also for example, the terms "first," "second," and the like may be used to describe various information in the present disclosure, the information should not be limited to these terms. For example, without departing from the scope of the present disclosure, first information may also be referred to as second information and, similarly, second information may also be referred to as first information.

The present disclosure provides a method for processing an application (App), which may be applied to a terminal. The terminal has a clone function. After the clone function is turned on, the terminal includes a main system and a clone system. A space occupied by the main system is referred to as a main space, a space occupied by the clone system is referred to as a clone space, and the main space and the clone space are mutually independent. The terminal may be a mobile phone, a computer, a notebook and the like.

Figure 1:
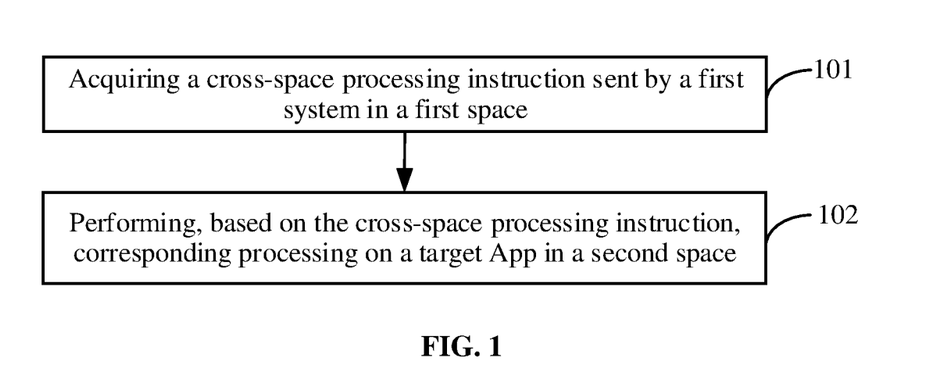
FIG. 1 is a flowchart of a method for processing an application according to an exemplary embodiment.

FIG. 1 is a flowchart showing a method for processing an App according to an exemplary embodiment. As shown in FIG. 1, the method for processing an App includes the following steps.

In step 101, a cross-space processing instruction sent by a first system in a first space is acquired.

In an embodiment, the cross-space processing instruction instructs the terminal to perform corresponding processing on a target App in a second space. There are various types of corresponding processings, such as installation, deletion, disabling and cache clearing and the like. The first space is the main space and the second space is the clone space, or, the first space is the clone space and the second space is the main space.

The first system may obtain the cross-space processing instruction in multiple manners. For example, the terminal provides a setting interface, and the setting interface provides different cross-space processing instructions. The first system acquires the cross-space processing instruction selected by a user. Also for example, the terminal provides the setting interface, and the user may set a second space identifier, a target App identifier and a program processing manner in the setting interface. The first system generates the cross-space processing instruction based on information set by the user. As another example, after a specified operation is executed on the target App in the first space, a dialog box pops up to query the user whether to execute the same operation on the target App in another space. After the user determines to execute the same operation on the target App in another space, the terminal obtains the cross-space processing instruction.

In an embodiment, in an Android system, different system services reside in system-server (SS) processes in a thread manner. The system services may include a Package Manager Server (PMS), an Activity Manager System Service (AMS) and the like. The PMS is configured to manage installation, uninstallation, right, updating and the like of Apps.

In an embodiment, the method for processing an App provided in the embodiment is applied to a system-server process. The system-server process receives the cross-space processing instruction sent by the first system, and subsequently invokes a PMS thread to perform corresponding processing on the target App in the second space based on the cross-space processing instruction, to implement processing the target App in a cross-space manner.

In step 102, corresponding processing is performed, based on the cross-space processing instruction, on a target App in a second space.

In an embodiment, the cross-space processing instruction may carry a second space identifier, a target App identifier and a program processing manner. The target App identifier may be, e.g., a package name of an installation package of the target App, a user identification (UID) and the like. The program processing manner may be, e.g., installation, deletion, disabling, cache clearing and the like.

In an embodiment, step 102 may be implemented in the following manner. In a first step, the second space corresponding to the second space identifier is determined; and in a second step, corresponding processing is performed, according to the program processing manner, on the target App which corresponds to the target App identifier in the second space.

For the above first step, a space identifier of the main space is different from a space identifier of the clone space, and a unique space may be determined based on a space identifier. The unique space is the main space or the clone space.

In an embodiment, after acquiring the cross-space processing instruction, the terminal may determine, based on the target App identifier, whether the target App has a right of being processed in a cross-space manner. When the target App has the right of being processed in a cross-space manner, the terminal determines the second space corresponding to the second space identifier. When the target App does not have the right of being processed in a cross-space manner, the terminal does not perform cross-space processing on the target App.

In an embodiment, the terminal may perform cross-space processing on a system App only, and does not perform cross-space processing on a non-system App, i.e., an ordinary App. The target App identifier may include a UID of the target App. After recognizing that the UID carried in the cross-space processing instruction is a UID of a system App, the terminal determines that the target App has the right of being processed in a cross-space manner, and then determines the second space corresponding to the second space identifier. For example, an App in an App store is a system App, and after it is determined that the UID carried in the cross-space processing instruction is a UID of an APP in App store, the second space corresponding to the second space identifier is determined.

For the above second step, under the circumstance that the target App is not stored in the second space and the program processing manner includes program installation, the terminal may acquire, based on the program processing manner, the target App corresponding to the target App identifier from the first space, and install the target App into the second space.

In an embodiment, the terminal may determine whether the target App is stored in the first space, that is, determine whether the installation package of the target App is stored in the first space. When the target App is stored in the first space, the terminal directly acquires the target App from the first space. When the target App is not stored in the first space, the terminal downloads the target App to the first space by using the first system and then acquires the target App from the first space.

After acquiring the downloaded target App from the first space, the terminal may uninstall the target App in the first space to reduce the space occupation of the first space.

In an embodiment, in the Android system, after determining that the first space includes the target App through interacting with the first system, the system-server process invokes the PMS thread to directly acquire the target App from the first space. After determining that the first space does not include the target App, the system-server process sends an instruction of downloading the target App to the first system, acquires the downloaded target App from the first space, and invokes the PMS thread to install the target App into the second space.

Under the circumstance that the target App is stored in the second space and the program processing manner includes program uninstallation, the terminal may uninstall the target App in the second space based on the program processing manner.

In the Android system, the system-server process may uninstall the target App in the second space through invoking the PMS thread.

Under the circumstance that the target App is stored in the second space and the program processing manner includes program disabling, the terminal may set the target App in the second space to a disabled state based on the program processing manner.

In the Android system, the system-server process may set the target App in the second space to the disabled state through invoking the PMS thread.

Figure 2:
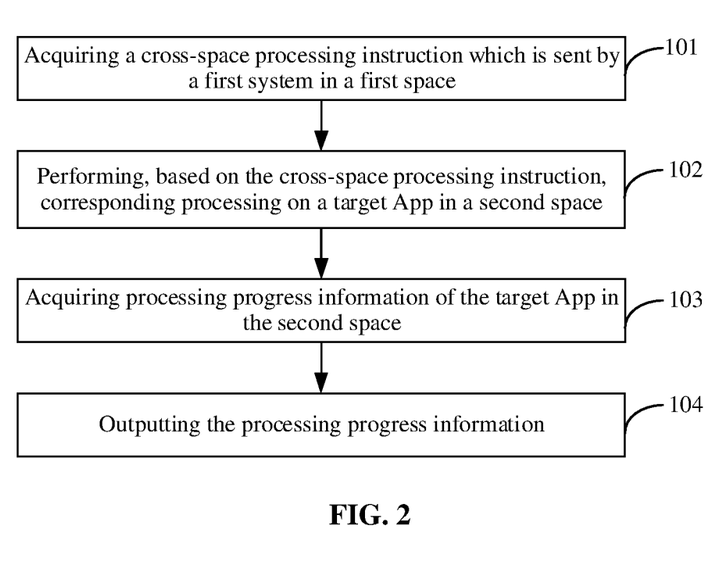
FIG. 2 is a flowchart of a method for processing an application according to an exemplary embodiment.

FIG. 2 is a flowchart showing a method for processing an App according to an exemplary embodiment. Based on the embodiment illustrated in FIG. 1, the method may further include the following steps. In step 103, processing progress information of the target App in the second space is acquired. In step 104, the processing progress information is output.

For step 103, when the specified operation is an installation operation, the terminal acquires installation process information of the target App in the second space. The installation progress information may include a percentage that an App has been installed, a portion that an App has been installed and the like. When the specified operation is an uninstallation operation, the terminal acquires uninstallation process information of the target App in the second space. The installation progress information may include a percentage that an App has been uninstalled, a portion that an App has been uninstalled and the like. When the specified operation is a cache clearing operation, the terminal acquires cache clearing progress information of the target App in the second space. The cache clearing progress information may include a percentage that a cache has been cleared, a portion that a cache has been cleared and the like.

For step 104, the first space may be a space currently used by the terminal. The first system may be a system currently used by the terminal, and the processing progress information may be output in the first space.

The processing progress information may be output in multiple manners, such as the processing progress information is displayed on a display screen, content of the processing progress information is played through a voice and the like. For example, the processing progress information may be displayed through a notification bar or a desktop. Any output manner that the user may perceive may be adopted.

Based on setting of the above steps, when using the first system and the first space, the user may perceive a processing progress of the App in the second space, such that user experience may be improved.

In an embodiment, a smart phone has a clone function, and after the clone function is turned on, the smart phone includes a parent space occupied by a parent system and a child space occupied by a child system. The parent system is a main system, and the child system is a clone system. The parent space is a main space, and the child space is a clone space.

When using the parent system and parent space on the smart phone, a parent executes a specified operation on the smart phone, to trigger the smart phone to perform corresponding processing on a target App in the child space, such as installing the target App into the child space, uninstalling an existing App in the child space or setting an existing App in the child space to a disabled state, and controlling the use duration of the target App in the child space and the like, such that the parent may conveniently control a child's use of the smart phone.

In the embodiments of the present disclosure, the terminal acquires the cross-space processing instruction sent by the first system in the first space, and performs corresponding processing on the target App in the second space based on the cross-space processing instruction. Through the method, when using the main space, the terminal may perform corresponding processing on the App in the clone space, when using the clone space, the terminal may perform corresponding processing on the App in the main space, such that processing the App in a cross-space manner is implemented, an operation in the related art that a user inputs a desktop password is eliminated. The above method of the present disclosure has the advantages of simple processing steps, high processing efficiency and the like, which improves the user experience.

For illustrative purposes, each of the foregoing method embodiments is described as a combination of a series of operations, but those skilled in the art should know that the present disclosure is not limited to the described operation sequence, and some steps may be executed in other sequences or at the same time.

Corresponding to the method embodiments, the present disclosure also provides embodiments of an App function realization device and a corresponding terminal.

Figure 3:
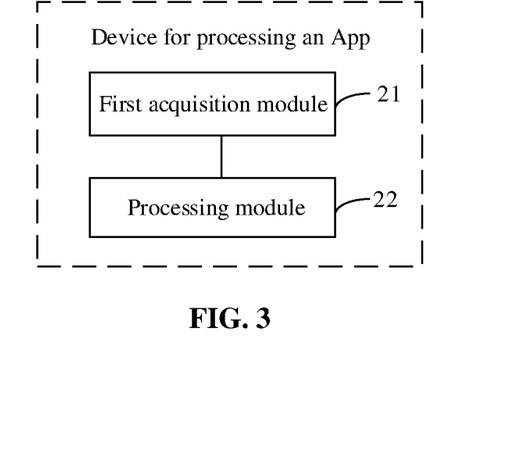
FIG. 3 is a block diagram of a device for processing an application according to an exemplary embodiment.

FIG. 3 is a block diagram of a device for processing an App according to an exemplary embodiment. The device is applied to a terminal, and the terminal includes a main space occupied by a main system and a clone space occupied by a clone system. Referring to FIG. 3, the device includes a first acquisition module 21 and a processing module 22.

The first acquisition module 21 is configured to acquire a cross-space processing instruction which is sent by a first system in a first space.

The processing module 22 is configured to perform, based on the cross-space processing instruction, corresponding processing on a target App in a second space.

The first space is the main space and the second space is the clone space, or the first space is the clone space and the second space is the main space.

In an embodiment, based on the device for processing an App shown in FIG. 3, the cross-space processing instruction carries a second space identifier, a target App identifier and a program processing manner. The processing module 22 may include a determination submodule and a processing submodule. The determination submodule is configured to determine the second space corresponding to the second space identifier. The processing submodule is configured to perform, according to the program processing manner, corresponding processing on the target App which corresponds to the target App identifier in the second space.

In an embodiment, the program processing manner may include program installation, and the processing submodule may include an acquisition unit and an installation unit. The acquisition unit is configured to acquire the target App corresponding to the target App identifier from the first space. The installation unit is configured to install the target App into the second space.

In an embodiment, the acquisition unit may include a determination subunit, a first acquisition subunit and a second acquisition subunit. The determination subunit is configured to determine whether the target App is stored in the first space. The first acquisition subunit is configured to, when the target App is stored in the first space, directly acquire the target App from the first space. The second acquisition subunit is configured to, when the target App is not stored in the first space, download the target App to the first space by using the first system and acquire the target App from the first space.

In an embodiment, the program processing manner may include program uninstallation, and the processing submodule may include an uninstallation unit. The uninstallation unit is configured to, when the program processing manner includes program uninstallation, uninstall the target App in the second space.

In an embodiment, the program processing manner may include program disabling, and the processing submodule may include a disabling unit. The disabling unit is configured to, when the program processing manner includes program disabling, set the target App in the second space to a disabled state.

In an embodiment, the determination submodule may include a first determination unit and a second determination unit. The first determination unit is configured to determine, based on the target App identifier, whether the target App has a right of being processed in a cross-space manner. The second determination unit is configured to, when the target App has the right of being processed in a cross-space manner, determine the second space corresponding to the second space identifier.

In an embodiment, based on the device for processing an App shown in FIG. 3, a system-server process has been installed in the terminal. The system-server process includes a PMS thread, and the device is applied to the system-server process. The processing module 22 may be configured to perform, based on the cross-space processing instruction, corresponding processing on the target App in the second space through invoking the PMS thread.

In an embodiment, based on the device for processing an App shown in FIG. 3, the device may further include a second acquisition module and an output module. The second acquisition module is configured to acquire processing progress information of the target App in the second space. The output module is configured to output the processing progress information.

The above device embodiments substantially correspond to the method embodiments, and reference may be made to the description of the method embodiments for relevant parts. The device embodiments described above are only exemplary, modules/units described as separate parts therein may or may not be physically separated, and parts displayed as modules/units may be located in the same place or may also be distributed on multiple networks. Part or all of the modules/units therein may be selected according to a practical requirement.

Embodiments of the present disclosure also provide a device for processing an App, which includes: a processor; and a memory configured to store processor-executable instructions. The processor is configured to: acquire a cross-space processing instruction which is sent by a first system in a first space; and perform, based on the cross-space processing instruction, corresponding processing on a target App in a second space, wherein the first space is a main space and the second space is a clone space, or the first space is the clone space and the second space is the main space.

Figure 4:
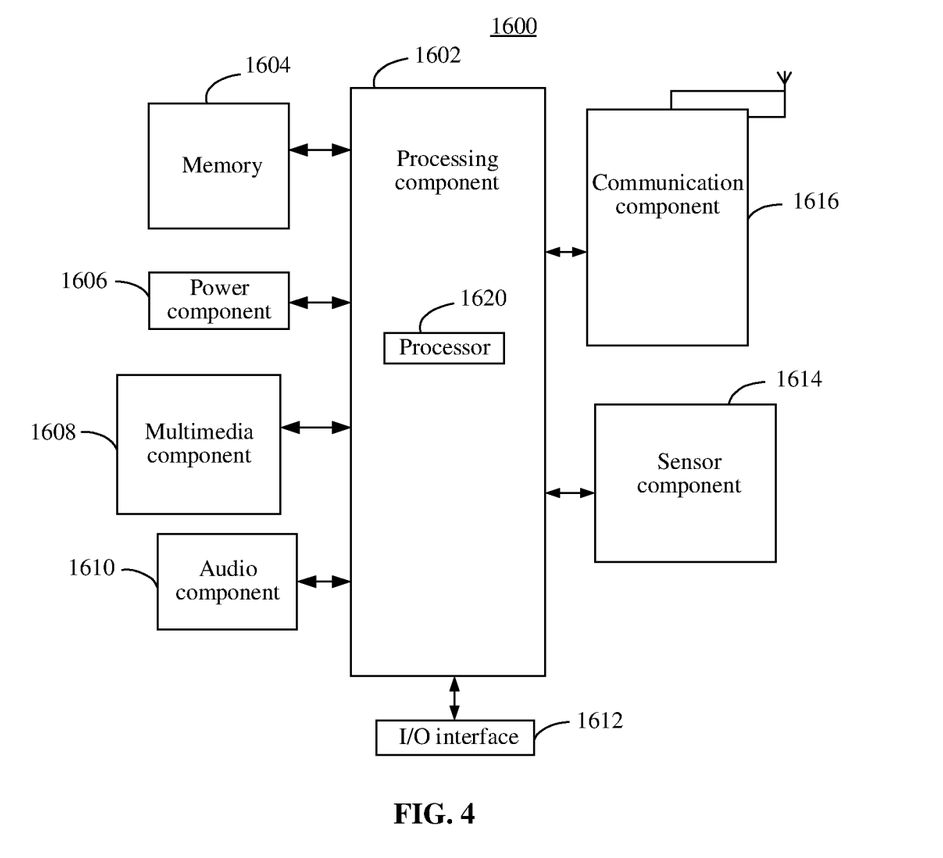
FIG. 4 is a schematic diagram of a device for processing an application according to an exemplary embodiment.

FIG. 4 is a schematic diagram of an App processing device 1600, according to an exemplary embodiment. For example, the device 1600 has a wireless Internet access function, and may be user equipment such as a mobile phone, a computer, a digital broadcast terminal, a messaging device, a gaming console, a tablet, a medical device, exercise equipment, a personal digital assistant and a wearable device such as a smart watch, smart glasses, a smart band and smart running shoes.

Referring to FIG. 4, the device 1600 may include one or more of the following components: a processing component 1602, a memory 1604, a power component 1606, a multimedia component 1608, an audio component 1610, an Input/Output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions, so as to complete all or part of the steps in the above described methods. Moreover, the processing component 1602 may include one or more modules which facilitate interaction between the processing component 1602 and the other components. For instance, the processing component 1602 may include a multimedia module to facilitate interaction between the multimedia component 1608 and the processing component 1602.

The memory 1604 is configured to store various types of data to support the operation of the device 1600. Examples of such data include instructions for any Apps or methods which are operated on the device 1600, contact data, phonebook data, messages, pictures, video, etc. The memory 1604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1606 provides power for various components of the device 1600. The power component 1606 may include a power management system, one or more power supplies, and other components associated with generation, management and distribution of power for the device 1600.

The multimedia component 1608 includes a screen which provides an output interface between the device 1600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also scan a duration and a pressure associated with the touch or swipe action. In some embodiments, the multimedia component 1608 includes a front camera and/or a rear camera. The front camera and/or the rear camera may receive external multimedia data when the device 1600 is in an operation mode, such as a photographing mode or a video mode. Each of the front camera and the rear camera may be a fixed optical lens system or have focus and optical zoom capabilities.

The audio component 1610 is configured to output and/or input an audio signal. For example, the audio component 1610 includes a Microphone (MIC). The MIC is configured to receive an external audio signal when the device 1600 is in the operation mode, such as a call mode, a recording mode and a voice recognition mode. The received audio signal may further be stored in the memory 1604 or sent through the communication component 1616. In some embodiments, the audio component 1610 further includes a speaker configured to output the audio signal.

The I/O interface 1612 provides an interface between the processing component 1602 and a peripheral interface module, and the peripheral interface module may be a keyboard, a click wheel, a button and the like. The button may include, but not limited to: a home button, a volume button, a starting button and a locking button.

The sensor component 1614 includes one or more sensors configured to provide status assessment in various aspects for the device 1600. For instance, the sensor component 1614 may scan an on/off status of the device 1600 and relative positioning of components, such as a display and small keyboard of the device 1600, and the sensor component 1614 may further scan a change in a position of the device 1600 or of a component of the device 1600, presence or absence of contact between the user and the device 1600, orientation or acceleration/deceleration of the device 1600 and a change in temperature of the device 1600. The sensor component 1614 may include a proximity sensor which is configured to scan presence of an object nearby without any physical contact. The sensor component 1614 may also include a light sensor, such as a Complementary Metal Oxide Semiconductor (CMOS) or Charge Coupled Device (CCD) image sensor, configured for use in an imaging App. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the device 1600 and other equipment. The device 1600 may access a communication-standard-based wireless network, such as a Wireless Fidelity (WiFi) network, a 4th-Generation (4G) or 5th-Generation (5G) network or a combination thereof. In an exemplary embodiment, the communication component 1616 receives a broadcast signal or broadcast associated information from an external broadcast management system through a broadcast channel In an exemplary embodiment, the communication component 1616 further includes a Near Field Communication (NFC) module to facilitate short-range communication. In an exemplary embodiment, the communication component 1616 may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above described method.

In an exemplary embodiment, there is also provided a non-transitory computer-readable storage medium, for example, the memory 1604 including an instruction. The instruction in the storage medium may be executed by the processor 1620 of the device 1600 to enable the device 1600 to execute a method for processing an App, the method includes that: a cross-space processing instruction sent by a first system in a first space is acquired; and corresponding processing is performed on a target App in a second space based on the cross-space processing instruction, wherein the first space is a main space and the second space is a clone space, or the first space is the clone space and the second space is the main space. The non-transitory computer-readable storage medium may be a ROM, a Random Access Memory (RAM), a Compact Disc Read-Only Memory (CD-ROM), a magnetic tape, a floppy disc, an optical data storage device and the like.

Figure 5:
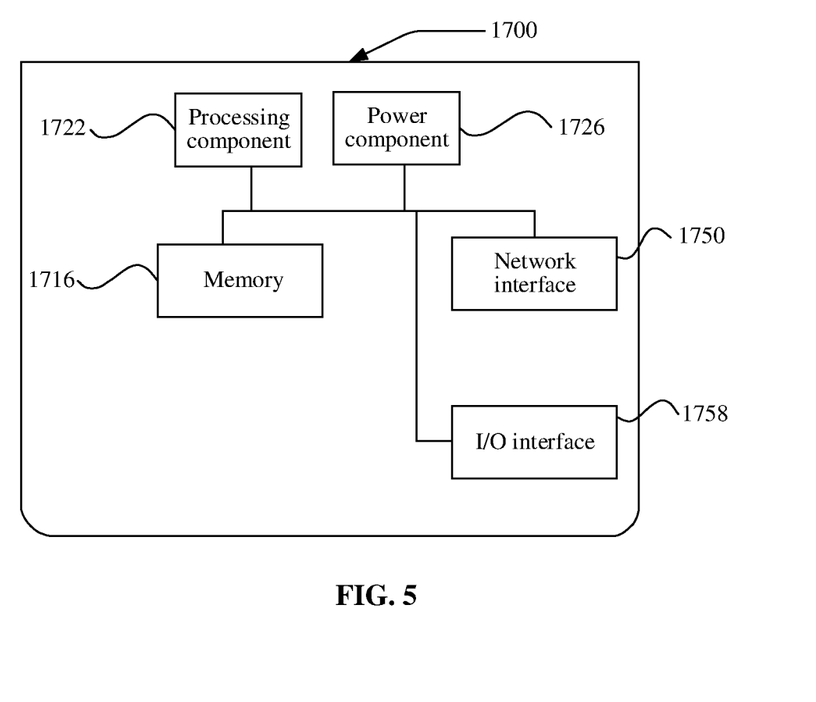
FIG. 5 is a schematic diagram of a device for processing an application according to an exemplary embodiment.

FIG. 5 is a schematic diagram of another App processing device 1700, according to an exemplary embodiment. For example, the device 1700 may be provided as an App server. Referring to FIG. 5, the device 1700 includes a processing component 1722, which further includes one or more processors, and a memory resource represented by a memory 1716. The memory is configured to store instructions executable for the processing component 1722, for example, an App. The App stored in the memory 1716 may include one or more than one module of which each corresponds to a set of instructions. In addition, the processing component 1722 is configured to execute the instructions to execute the above described App processing method.

The device 1700 may further include a power component 1726 which is configured to execute power management of the device 1700, a wired or wireless network interface 1750 which is configured to connect the device 1700 to a network, and an I/O interface 1758. The device 1700 may be operated based on an operating system stored in the memory 1716, for example, Android, iOS, Windows Server™, Mac OS X™, Unix™, Linux™, FreeBSD™ or the like.

In an exemplary embodiment, there is also provided a non-transitory computer-readable storage medium including an instruction, for example, the memory 1716 including an instruction. The instruction may be executed by the processing component 1722 of the device 1700 to implement the above described method. For example, the non-transitory computer-readable storage medium may be a ROM, a RAM, a CD-ROM, a magnetic tape, a floppy disc, an optical data storage device and the like.

The instruction in the memory 1716 is executed by the processing component 1722 to cause the device 1700 to execute an App processing method, and the method includes that: a cross-space processing instruction sent by a first system in a first space is acquired; and corresponding processing is performed, based on the cross-space processing instruction, on a target App in a second space, wherein the first space is a main space and the second space is a clone space, or the first space is the clone space and the second space is the main space.

Other implementations of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be understood that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for processing an application, applied to a terminal including a main space occupied by a main system and a clone space occupied by a clone system, the method comprising:

acquiring a cross-space processing instruction sent by a first system in a first space, wherein the cross-space processing instruction includes an identifier of a second space, a target application identifier of a target application, and a program processing manner, and the first space is the clone space and the second space is the main space; and performing, based on the cross-space processing instruction, corresponding processing on the target application in the second space, including:

determining the second space corresponding to the identifier of the second space; and performing, according to the program processing manner, corresponding processing on the target application corresponding to the target application identifier in the second space;

wherein performing, according to the program processing manner, the corresponding processing on the target application corresponding to the target application identifier in the second space includes:

when the program processing manner includes program installation, acquiring the target application corresponding to the target application identifier from the first space, and installing the target application into the second space;
when the program processing manner includes program uninstallation, uninstalling the target application in the second space; and
when the program processing manner includes program disabling, setting the target application in the second space to a disabled state;
wherein determining the second space corresponding to the identifier of the second space comprises:
determining, based on the target application identifier, whether the target application has a right of being processed in a cross-space manner; and
when the target application has the right of being processed in a cross-space manner, determining the second space corresponding to the second space identifier.

2. The method of claim 1, wherein acquiring the target application corresponding to the target application identifier from the first space comprises:
determining whether the target application is stored in the first space;
when the target application is stored in the first space, directly acquiring the target application from the first space; and
when the target application is not stored in the first space, downloading the target application to the first space by using the first system, and acquiring the target application from the first space.

3. The method of claim 1, wherein a system-server process is installed in the terminal, the system-server process including a Package Manager Server (PMS) thread, and performing, based on the cross-space processing instruction, corresponding processing on the target application in the second space comprises:
performing by the system-server process, based on the cross-space processing instruction, corresponding processing on the target application in the second space through invoking the PMS thread.

4. The method of claim 1, further comprising:
acquiring processing progress information of the target application in the second space; and
outputting the processing progress information.

5. A device for processing an application, applied to a terminal including a main space occupied by a main system and a clone space occupied by a clone system, the device comprising:
a processor; and
a memory configured to store instructions executable by the processor,
wherein the processor is configured to:
acquire a cross-space processing instruction sent by a first system in a first space, wherein the cross-space processing instruction includes an identifier of a second space, a target application identifier of a target application, and a program processing manner, and the first space is the clone space and the second space is the main space; and
perform, based on the cross-space processing instruction, corresponding processing on the target application in the second space, including:
determining the second space corresponding to the identifier of the second space; and
performing, according to the program processing manner, corresponding processing on the target application corresponding to the target application identifier in the second space;
wherein performing, according to the program processing manner, the corresponding processing on the target application corresponding to the target application identifier in the second space includes:
when the program processing manner includes program installation, acquiring the target application corresponding to the target application identifier from the first space, and installing the target application into the second space;
when the program processing manner includes program uninstallation, uninstalling the target application in the second space; and
when the program processing manner includes program disabling, setting the target application in the second space to a disabled state;
wherein the processor is further configured to:
determine, based on the target application identifier, whether the target application has a right of being processed in a cross-space manner; and
when the target application has the right of being processed in a cross-space manner, determine the second space corresponding to the identifier of the second space.

6. The device of claim 5, wherein the processor is further configured to:
determine whether the target application is stored in the first space;
when the target application is stored in the first space, directly acquire the target application from the first space; and
when the target application is not stored in the first space, download the target application to the first space by using the first system and acquire the target application from the first space.

7. The device of claim 5, wherein a system-server process is installed in the terminal, the system-server process including a Package Manager Server (PMS) thread, and the processor is further configured to:
perform by the system-server process, based on the cross-space processing instruction, corresponding processing on the target application in the second space through invoking the PMS thread.

8. The device of claim 5, wherein the processor is further configured to:
acquire processing progress information of the target application in the second space; and
output the processing progress information.

9. A non-transitory computer-readable storage medium having stored thereon instructions that, when executed by a processor of a terminal, cause the terminal to perform a method for processing an application, the terminal including a main space occupied by a main system and a clone space occupied by a clone system, the method comprising:
acquiring a cross-space processing instruction sent by a first system in a first space, wherein the cross-space processing instruction includes an identifier of a second space, a target application identifier of a target application, and a program processing manner, and the first space is the clone space and the second space is the main space; and
performing, based on the cross-space processing instruction, corresponding processing on the target application in the second space, including:

determining the second space corresponding to the identifier of the second space; and performing, according to the program processing manner, corresponding processing on the target application corresponding to the target application identifier in the second space;

wherein performing, according to the program processing manner, the corresponding processing on the target application corresponding to the target application identifier in the second space includes:

when the program processing manner includes program installation, acquiring the target application corresponding to the target application identifier from the first space, and installing the target application into the second space;

when the program processing manner includes program uninstallation, uninstalling the target application in the second space; and when the program processing manner includes program disabling, setting the target application in the second space to a disabled state;

wherein determining the second space corresponding to the identifier of the second space comprises:

determining, based on the target application identifier, whether the target application has a right of being processed in a cross-space manner; and when the target application has the right of being processed in a cross-space manner, determining the second space corresponding to the second space identifier.

10. The non-transitory computer-readable storage medium of claim 9, wherein acquiring the target application corresponding to the target application identifier from the first space comprises:

determining whether the target application is stored in the first space;

when the target application is stored in the first space, directly acquiring the target application from the first space; and when the target application is not stored in the first space, downloading the target application to the first space by using the first system, and acquiring the target application from the first space.

\* \* \* \* \*